United States Patent
Goodman et al.

(10) Patent No.: US 7,039,924 B2
(45) Date of Patent: May 2, 2006

(54) SYSTEM AND METHOD OF PROVIDING AND RELOCATING A PORTABLE STORAGE CANISTER IN AN AUTOMATED DATA STORAGE LIBRARY

(75) Inventors: Brian Gerard Goodman, Tuscon, AZ (US); Michael Philip McIntosh, Tucson, AZ (US); Aaron Lyle Herring, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 10/374,884

(22) Filed: Feb. 24, 2003

(65) Prior Publication Data

US 2004/0165489 A1    Aug. 26, 2004

(51) Int. Cl.
*G11B 17/03* (2006.01)
(52) U.S. Cl. .................................................... 720/600
(58) Field of Classification Search ................ 720/600; 369/30.42, 30.53, 30.66, 30.67, 30.68, 30.77, 369/30.78
See application file for complete search history.

(56) References Cited

U.S. PATENT DOCUMENTS

| 4,362,977 A | 12/1982 | Evans |
| 4,527,262 A | 7/1985 | Manto |
| 4,908,777 A | 3/1990 | Wolfe |
| 5,231,616 A | 7/1993 | Oliver et al. |
| 5,303,214 A | 4/1994 | Kulakowski |
| 5,331,232 A | 7/1994 | Moy et al. |
| 5,426,581 A | 6/1995 | Kishi et al. |
| 5,442,500 A * | 8/1995 | Hidano et al. ................ 360/92 |
| 5,703,843 A * | 12/1997 | Katsuyama et al. ..... 369/30.33 |
| 5,790,338 A | 8/1998 | Kanai et al. |
| 5,850,569 A | 12/1998 | Luif et al. |
| 5,940,243 A * | 8/1999 | Kanetsuku et al. ........... 360/92 |
| 5,946,160 A | 8/1999 | Ohashi |

(Continued)

FOREIGN PATENT DOCUMENTS

JP    55-153169    11/1980

OTHER PUBLICATIONS

M. Greco, T. Haberman and G. Kishi, "Automatic Teaching of Storage Racks in an Automated Tape Library", IBM Technical Disclosure Bulletin, vol. 36, No. 06B, Jun. 1993, TU892-0075 MWS, pp. 541-543.

(Continued)

*Primary Examiner*—David Davis
(74) *Attorney, Agent, or Firm*—Jean M. Barkley; Dillon & Yudell LLP

(57) ABSTRACT

A portable canister for upgrading, converting, or servicing an automated data storage library includes an assembly with cartridge cells. The portable canister is mounted within a data storage drive compartment, and/or another slot within the automated data storage library. The storage capacity of the library may be increased by adding portable storage canisters. When occupying a data storage drive slot, the portable storage canister may be removed and replaced with a data storage drive. Dual accessor library expansion may be simplified by using the portable canister as a test canister in the service bay of the library. Any library frame or storage module may become the service bay simply by inserting a test canister into the frame or storage module. This eliminates the need to shut down the library and reconfigure the frames to relocate the service bay.

4 Claims, 13 Drawing Sheets

U.S. PATENT DOCUMENTS

| | | |
|---|---|---|
| 6,041,026 A | 3/2000 | Hammar et al. |
| 6,153,999 A | 11/2000 | Borrego |
| 6,185,165 B1 | 2/2001 | Jesionowski et al. |
| 6,219,313 B1 | 4/2001 | Ries et al. |
| 6,239,941 B1 | 5/2001 | Small |

OTHER PUBLICATIONS

P. Chang, G. Kishi, S. Obeid and D. Tsosie, "Teach Mastering Process for an Automated Tape Library", IBM Technical Disclosure Bulletin, vol. 36, No. 06B, Jun. 1993, TU892-0076MWS, pp. 545-547.

P. Abbott, T. Haberman, G. Kishi and B. Taebel, "Teaching 3490 Integrated Cartridge Loader Positions using a Tooling Cartridge in an Automated Tape Library", IBM Technical Disclosure Bulletin, vol. 36, No. 06B, Jun. 1993, TU892-0074 MWS, pp. 113-115.

J. Ellis, "Automatic Cartridge Tape Library Grip Mechanism", IBM Technical Disclosure Bulletin, vol. 36, No. 08, Aug. 1993, TU891-0042 MWS, pp. 265-267.

* cited by examiner

SYSTEM AND METHOD OF PROVIDING AND RELOCATING A PORTABLE STORAGE CANISTER IN AN AUTOMATED DATA STORAGE LIBRARY

BACKGROUND OF THE INVENTION

1. Technical Field

The present invention relates in general to portable storage cells in an automated data storage library, and in particular to an improved system and method for providing a portable storage canister for an automated data storage library.

2. Description of the Related Art

Data storage drives, such as data tape drives, record information to and read information from media, such as the data tape of a tape cartridge. Data storage drives are often used in conjunction with, for example, a data storage and retrieval system. One example of such a system is an automated data storage library with robotic picking devices, wherein removable media cartridges are selectively transported between storage cells and data storage drives in an automated environment. Herein, automated data storage library, data storage library, data storage and retrieval system, and library may all be used interchangeably.

Once requested, data that is stored on data storage media of an automated data storage library typically is needed quickly. Thus, it is desirable that an automated data storage library be maintained in an operational condition on a continuous basis as much as possible. As a result, user expectations have moved toward a concept of continuous availability, such as the well known "24×7×365" availability. For example, some automated data storage libraries contain two accessors for improved speed and redundancy. If one accessor fails, another accessor may take over in its place.

In the art, data storage magazines are provided for adding or removing more than one cartridge at a time. Magazines may also be used to add or remove storage capacity. Magazines require that the library door be opened in order to add or remove the magazine. This is a disruptive activity as the automated data storage library must be paused or stopped during the addition or removal of the magazines. There is a need to provide a system and method for adding or removing storage without disrupting the automated data storage library.

In addition, data storage drives are added to or removed from a data storage library as needed. Some libraries offer additional storage cells where drives may otherwise exist. A conversion is required to remove this additional storage whenever a drive is required to takes its place. Conversely, a conversion is also required if a drive is removed and replaced with the additional storage. The conversion requires that the library door be opened and this disrupts normal library operation. In addition, tools are required to perform these conversions and this process usually requires a trained service technician. There is a need to provide a portable and flexible storage cell conversion in an automated data storage library.

The robotic accessors used to manipulate the cartridges are typically required to access a test station or service bay that is located within the confines of the library in order to test and/or calibrate the cartridge grippers (e.g., for the type of cartridge used in the library). Some libraries use dedicated storage cells within the normal operational space of the library. These may be storage cells that could otherwise be used for user storage, or they may be dedicated diagnostic cells that never contain user media. In dual accessor libraries, one problem with this approach is that library operation may have to be interrupted in order to calibrate or test a gripper. This is because the accessor performing the calibration or test operation may be in the way of the other accessor.

Still other libraries may use a special dedicated service area with fixed cells or features. For example, dual accessor libraries commonly use two of these dedicated service areas, with one service area being located at each end of the library. This allows one of the accessors to calibrate or test its grippers without interfering with the operation of the other accessor. A problem with this approach is that these fixed features cannot be easily modified because they are fixed in place. For example, if a media type is added to or removed from a library that supports mixed media then special tools may be required to modify the fixed service area. Thus, some service bays are not portable since they are dedicated to their positions because of other equipment present in the system.

Relocating such types of service bays is a lengthy and cumbersome task. Whenever the library is reconfigured to add additional frames to the system, the service bay typically is relocated to the new frame on the end of the library. In order to relocate the service bay, the entire library must be shut down, disassembled to uninstall the service bay, and then reconfigured and reassembled with the service bay in the new frame. Although this system and method of relocating a service bay in a library is workable, an improvement would be desirable. Additionally, there is a need to provide a portable and flexible test canister in an automated data storage library that can be used to calibrate and/or test grippers for different types of media.

SUMMARY OF THE INVENTION

In one embodiment, a portable storage canister comprises, for example, a tray, canister, or other assembly with one or more cartridge cells. The portable storage canister is inserted into a wall of storage without disrupting library operation. In one variation of this embodiment, the portable storage canister is used to upgrade an automated data storage library. The upgrade could be used to provide additional storage as an upgrade option. This way, additional storage can be sold or purchased as needed. The portable storage canister is inserted into the library without entering the user storage area, which is how the operation is performed in a non-disruptive manner.

In another embodiment, a portable storage canister comprises, for example, a tray, canister, or other assembly with one or more cartridge cells. The portable storage canister is inserted into a multi-purpose slot that may contain the portable storage canister, a drive, some other component of the library, combinations thereof or nothing at all. In one variation of this embodiment, the multi-purpose slots may start out as being filled with drives and portable storage canisters. As more drives are needed, the portable storage canister may be removed and replaced with a drive. In another variation of this embodiment, the portable storage canister is used to upgrade an automated data storage library. The upgrade could be used to provide additional storage as an upgrade option. This way, additional storage can be sold or purchased as needed.

In yet another embodiment, a portable storage canister includes, for example, a tray, canister, or other assembly with one or more cartridge cells. The portable storage canister is used for servicing an automated data storage library. For clarity of discussion, this is also called a portable test canister. Herein, portable test canister, portable storage canister, test canister, portable canister, and storage canister are used for descriptive purposes and may be interchanged. The cartridge cells may be used to hold diagnostic cartridges, ordinary data cartridges or some other cartridge. The cartridge cells may also be used to test the ability of the library gripper to retrieve media from the cell and place media into the cell. There may be one or more cartridge cells for each type of media supported by the library, or there may be separate test canisters for each media type in the library, or combinations thereof.

In still another embodiment, the portable test canister is placed in a drive slot of the library. Drive slots are common and usually exist in every frame of a library. Dedicated service areas consume valuable library space that cannot be reclaimed. On the other hand, drive slots provide a very high level of portability and spatial reuse. In this embodiment, the portable test canister only consumes library space when a library is full of drives or storage. The portable test canister can be moved as drives and frames are added to or removed from the library. Dual accessor libraries are expected to maintain normal operation, even when being serviced. The impact to dual-accessor library operation can be minimized by placing the portable test canister at both ends of the library. This allows one accessor to calibrate or test its grippers while the other accessor is performing normal library operations.

There may still be a small potential for degradation of service in normal library operation during a test/calibrate operation, depending on the design of the library. For example, if drives slots are arranged in columns and a portable test canister is located in a column that also contains drives, then an accessor cannot access one of those drives while the other accessor is testing or calibrating its gripper. The testing accessor may be temporarily moved out of the way to allow access to a drive. Alternatively, one accessor may wait until the other accessor has finished any operations in the conflicting column. Still further, the impact can be eliminated by locating all of the drives in frames other than the end frames.

Another embodiment of a portable test canister for servicing an automated data storage library includes a test tray with one or more test cartridge cells. The portable test canister is adapted to be mounted within a standard drive compartment in a frame of a multi-frame library. One portable test canister is typically located on an end of the library. In one version, the test canister cartridge cells contain one sample data storage cartridge for each type of cartridge that is used by the automated data storage library for test and/or calibration of the robotic picker utilized by the library. During the life of the library, the size of the library may be changed by adding or removing one or more frames to/from the library. However, rather than shutting down the entire library and reconfiguring the frames in order to relocate the service bay, the portable test canister of the present invention is adapted to be quickly relocated by simply removing it from its original position and relocating the portable test canister to one of the drive compartments in the new end frame.

The foregoing and other objects- and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

FIG. 5, which includes both FIGS. 5A-1 and 5A-2, is a schematic diagram of an alternate storage module utilized by the data storage and retrieval system of FIG. 1.

DETAILED DESCRIPTION OF A PREFERRED EMBODIMENT

Figure 1:
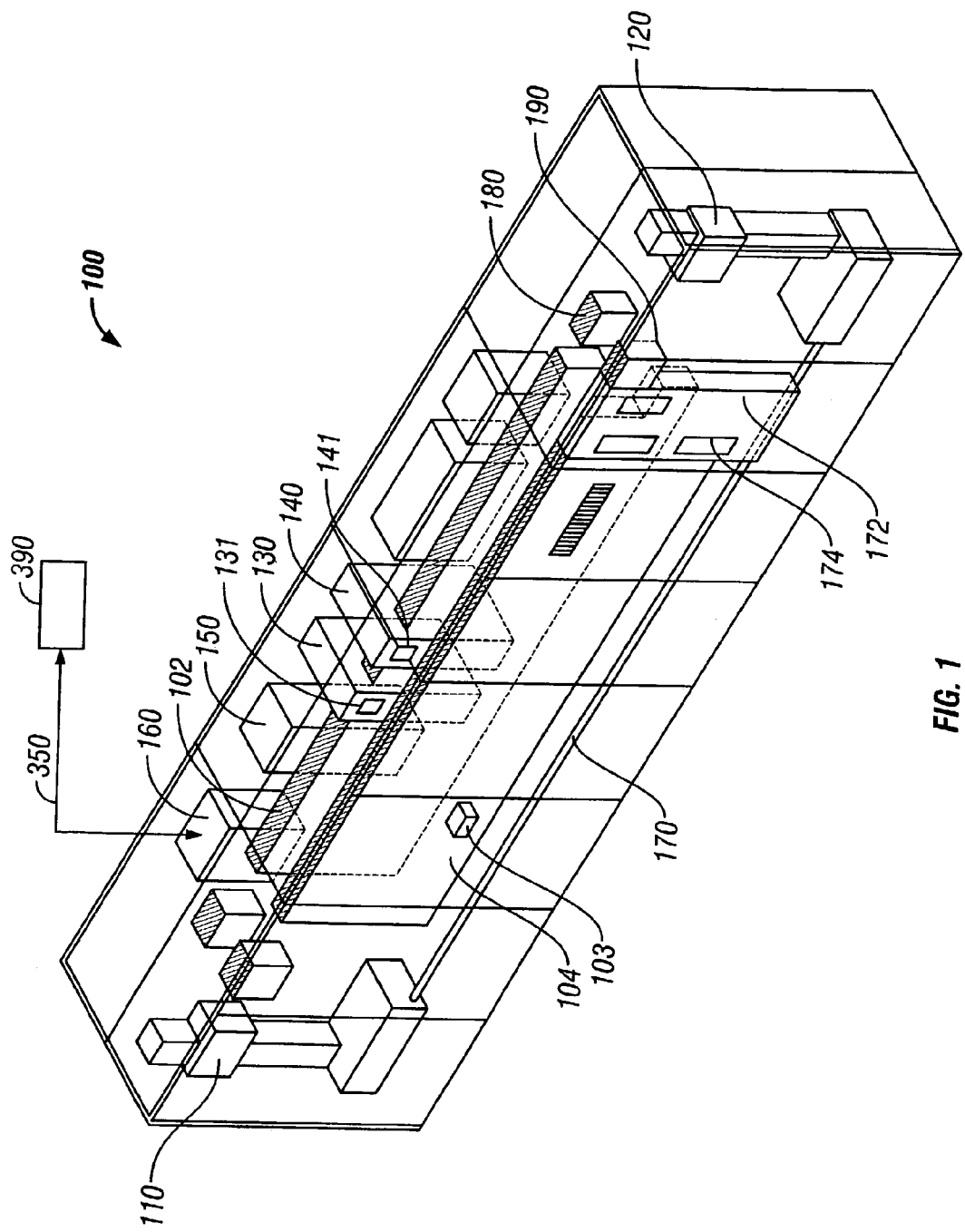
FIG. 1 is an isometric view of one embodiment of a data storage and retrieval system constructed in accordance with the present invention.
Figure 3:
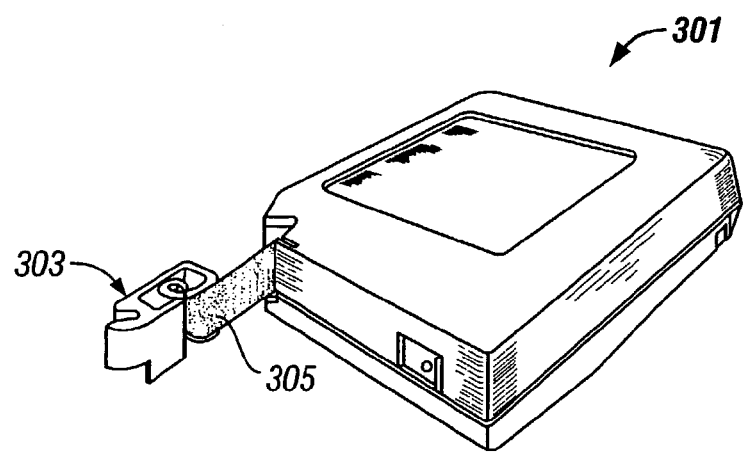
FIG. 3 is an isometric view of a removable tape cartridge used in conjunction with the tape drive of FIG. 2.

Referring to FIG. 1, a data storage and retrieval system 100 is shown. In the embodiment illustrated, data storage and retrieval system 100 is depicted as a robotic library. The upper interface of controller 160 allows data storage and retrieval system 100 to communicate with one or more hosts 390 via link 350. Link 350 may comprise an Ethernet, Infiniband, TCP/IP, Fibre Channel-Arbitrated Loop, SCSI, ESCON, FICON, or the like, depending on the application. The lower interface of controller 160 communicates with a plurality of drives that are positioned in drive enclosures 130 and 140. Drive enclosures 130 and 140 receive removable media cartridges 103 (e.g., see cartridges in FIGS. 3, 7, and 8), via robotic pickers 110 and 120. The removable media cartridges 103 may contain magnetic tape, optical tape, optical disk media, magneto-optical disk, CD, DVD, phase-change media, floppy disk, removable hard disk, electronic media, and the like. Robotic pickers 110 and 120 travel along rail 170 to move removable media cartridges 103 from inner storage wall 102 and outer storage wall 104 to drive enclosures 130 and 140 for the purposes of reading and/or writing data. Robotic pickers 110 and 120 also return the removable media cartridges 103 to storage walls 102 and 104.

An import/export station 172 includes access door 174 attached to the side of data storage and retrieval system 100. Access door 174 is preferably pivotally attached to the side of data storage and retrieval system 100; however, access door 174 could be slidably or otherwise attached. An operator panel or access station 150 permits a user to communicate directly with data storage and retrieval system 100. The operator access station 150 typically contains an LCD display, a keyboard or touch screen for user input, and circuits to monitor and control the I/O station doors.

First power component 180 and second power component 190 each comprise one or more power supplies that supply power to pickers 110 and 120, controller 160, operator access station 150, and drive enclosures 130 and 140 of data storage and retrieval system 100. Typically, at least one of the power components 180 and 190 provides direct current (DC) power, since most computer peripheral devices use DC power. One of the power components 180 and 190 may provide alternating current (AC) power as well. Controller 160 is in communication with power components 180 and 190, pickers 110 and 120, operator access station 150, drive enclosures 130 and 140, and data storage drives (see FIGS. 2, 13, and 14) of data storage and retrieval system 100.

Figure 2:
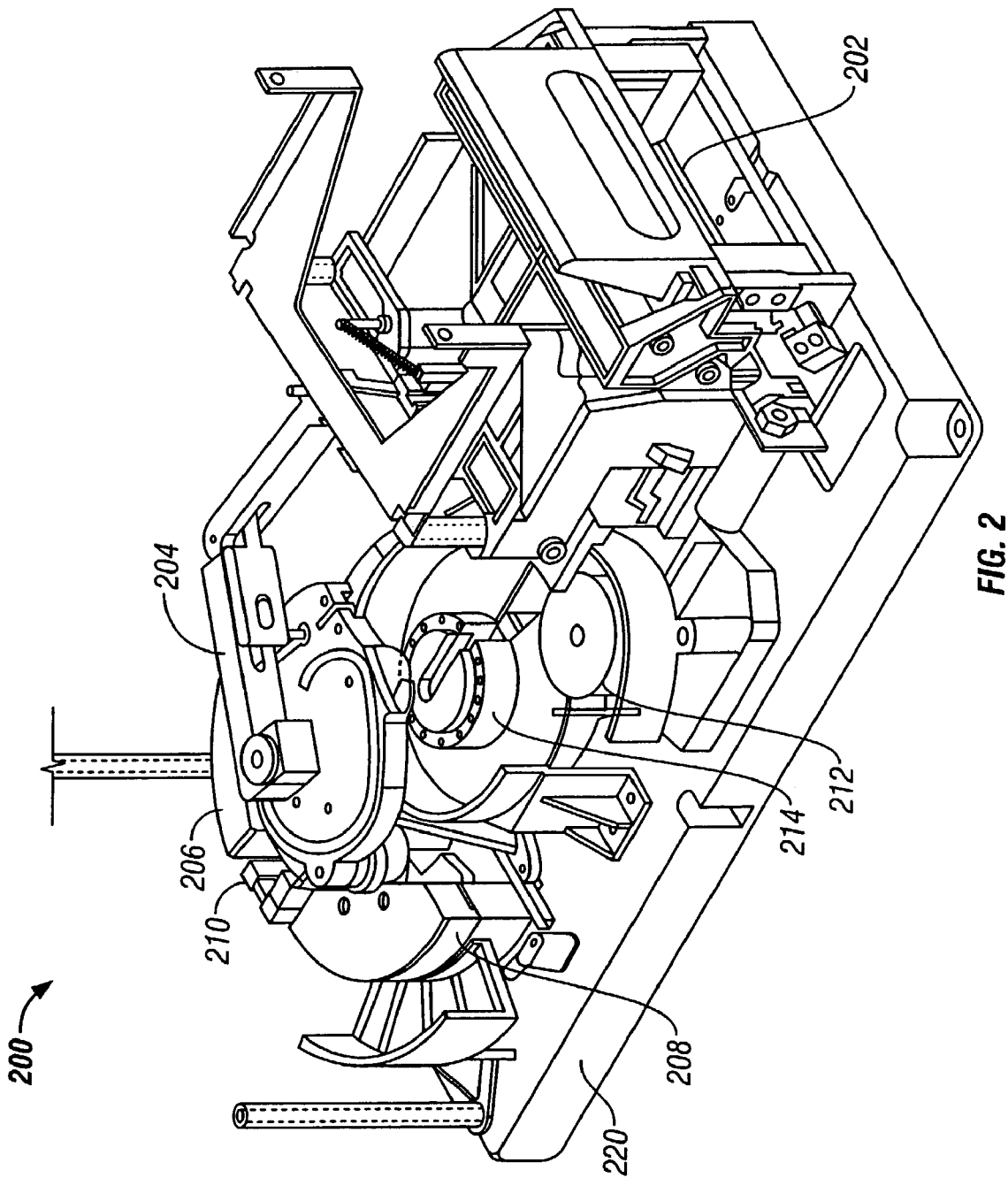
FIG. 2 is an isometric view of a tape drive utilized by the data storage and retrieval system of FIG. 1.

Referring now to FIG. 2, a typical reel-to-reel tape drive 200 is shown. As described above, any removable media data storage drive may be used, such as tape drives, optical and magnetic disk drives, electronic media drives, or any other drives and media as is known to those skilled in the art. A plurality of drives 200 are usually located inside of the library 100 of FIG. 1. Tape drive 200 may be any one of, for example, a family of tape drives using a single-reel tape cartridge, such as the IBM 3480, IBM 3490, IBM 3590, Digital Linear Tape (DLT), and Linear Tape Open (LTO) tape drives. Cartridge loader 202 receives a single-reel tape cartridge 301 (see FIG. 3) and threader 204 threads the leader-block 303 of the tape 305 around the tape guides 206 and 208, and around the tape tension transducer 212, and into the take-up reel 214. Tape guides 206 and 208 support the tape as the tape moves over the magnetic tape head 210. All of these components are supported by base plate 220. One or more tape drives 200 are located inside drive enclosures 130, 140 (FIG. 1) in order to protect the tape drives 200 from dust and debris, as well as extraneous air currents that could disturb the way the magnetic tape 305 passes over the magnetic head 210.

Figure 4:
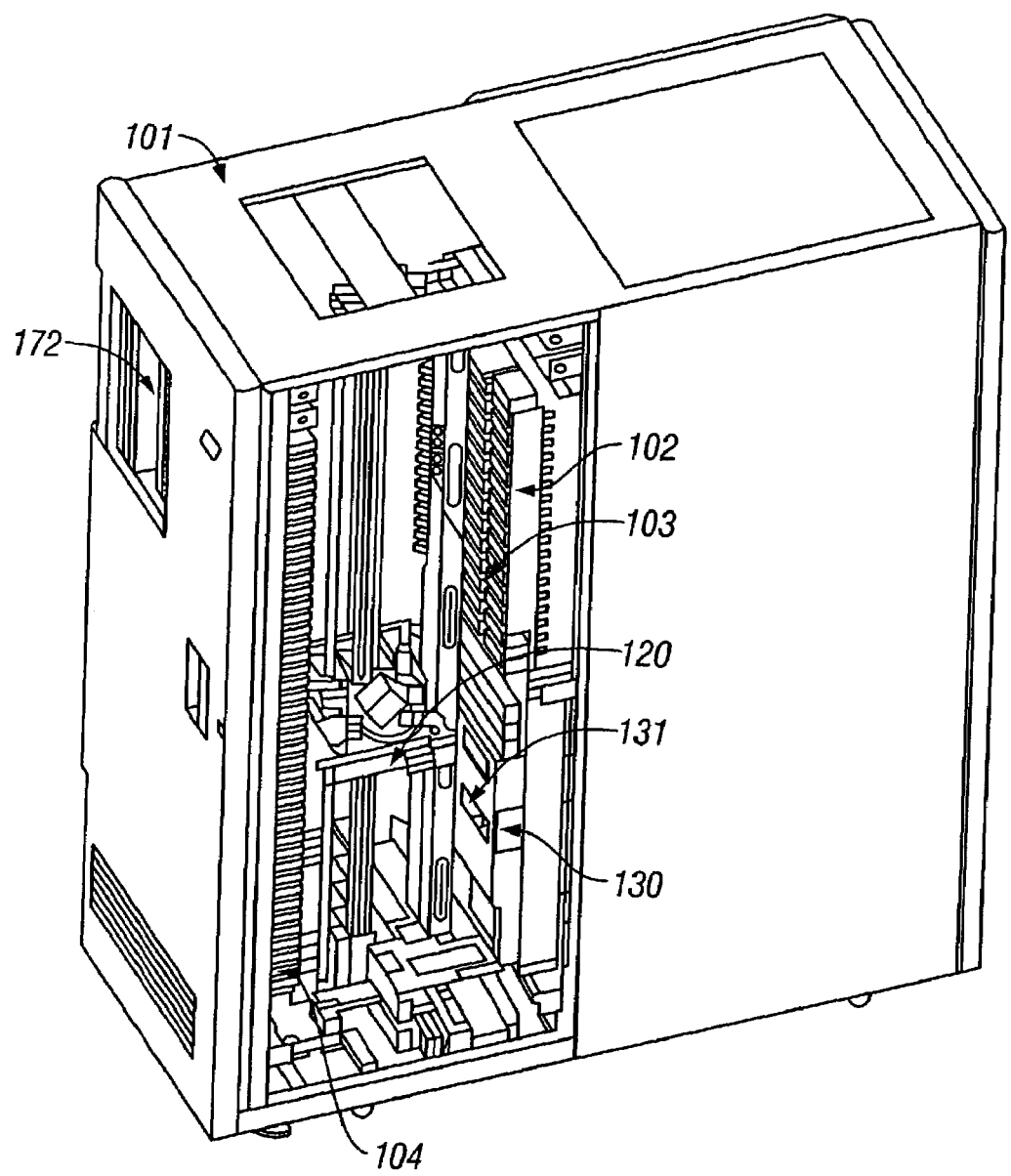
FIG. 4 is an isometric view of a storage module utilized by the data storage and retrieval system of FIG. 1.

The data storage and retrieval system 100 of FIG. 1 is typically assembled from a series of frames or storage modules 101, such as the L-frame type storage module illustrated in FIG. 4. A storage module is an expansion component of the library. Frames, accessors, magazines, etc. may comprise examples of storage modules. The storage module may comprise one or more of the following; one or more storage shelves for holding data storage media, one or more data storage drives for reading and/or writing data on the data storage media, one or more import/export stations for operator access to the data storage media, one or more accessors for moving the data storage media to/from data storage drives and storage shelves, one or more frames or compartments for holding additional storage modules or library components. In the example of FIG. 1, the desired number of storage modules 101 are assembled into data storage and retrieval system 100. Storage module 101 comprises a picker 120, a drive enclosure 130, an inner storage wall 102, and an outer storage wall 104. A plurality of removable storage media 103 are located in each storage wall 102, 104. In this example, removable storage media 103 comprises tape cartridges, but may also comprise other types of media such as those described above.

Figure 9:
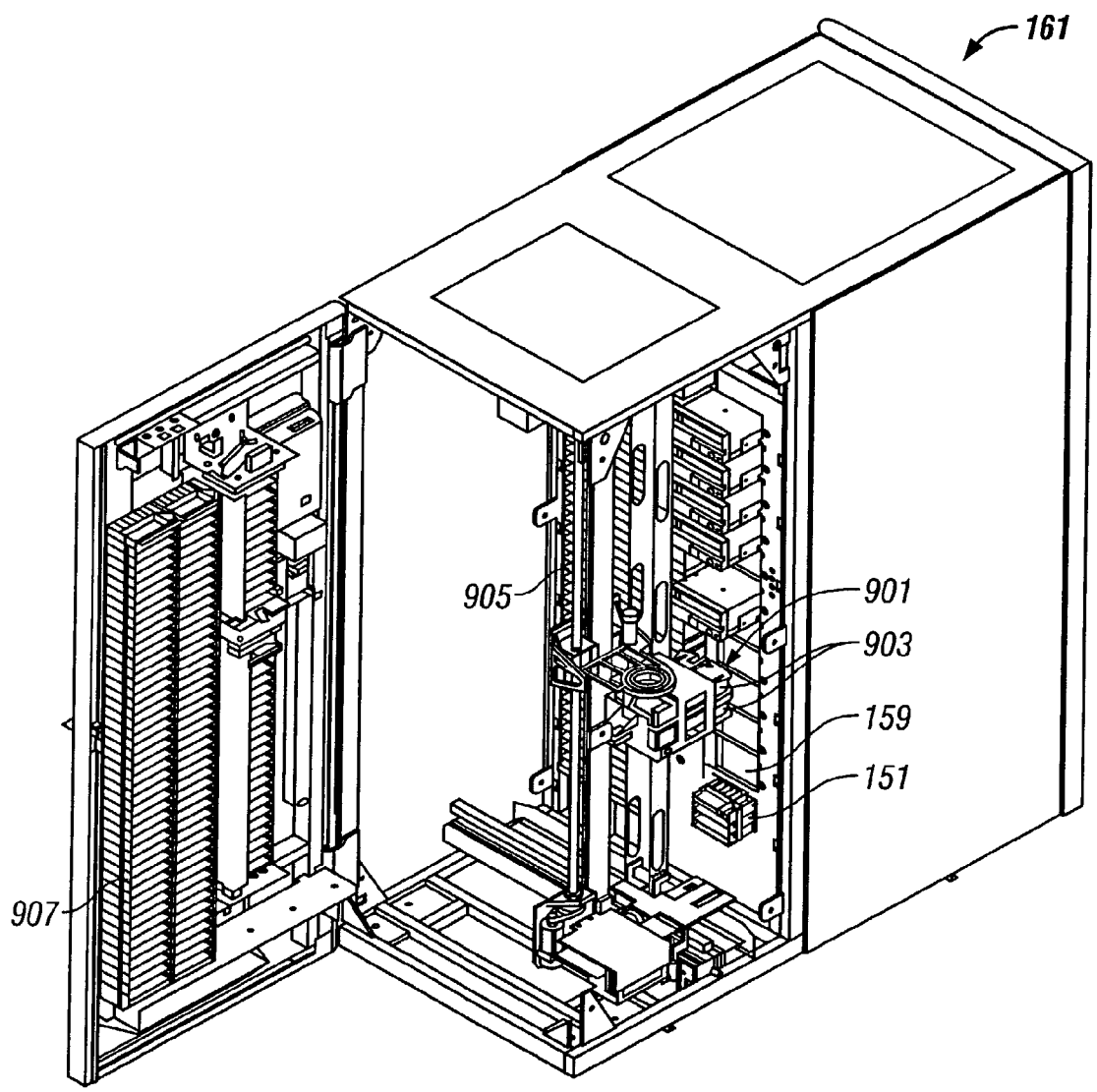
FIG. 9 is an isometric view of an alternate configuration of the storage module of FIG. 4 with a front door open and a rear door closed.
Figure 13:
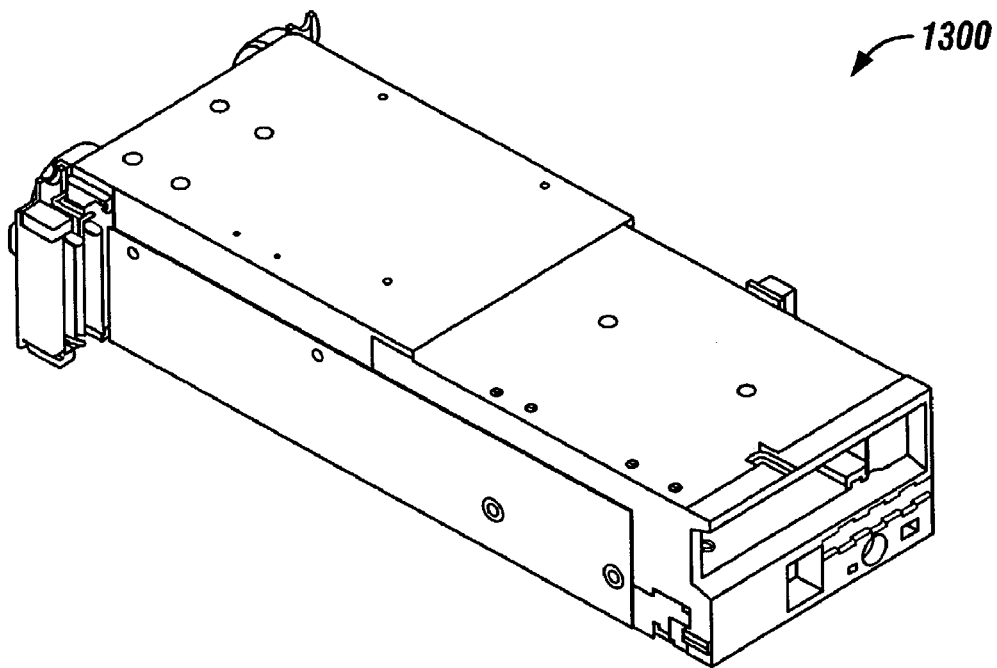
FIG. 13 is a front isometric view of a drive canister.
Figure 14:
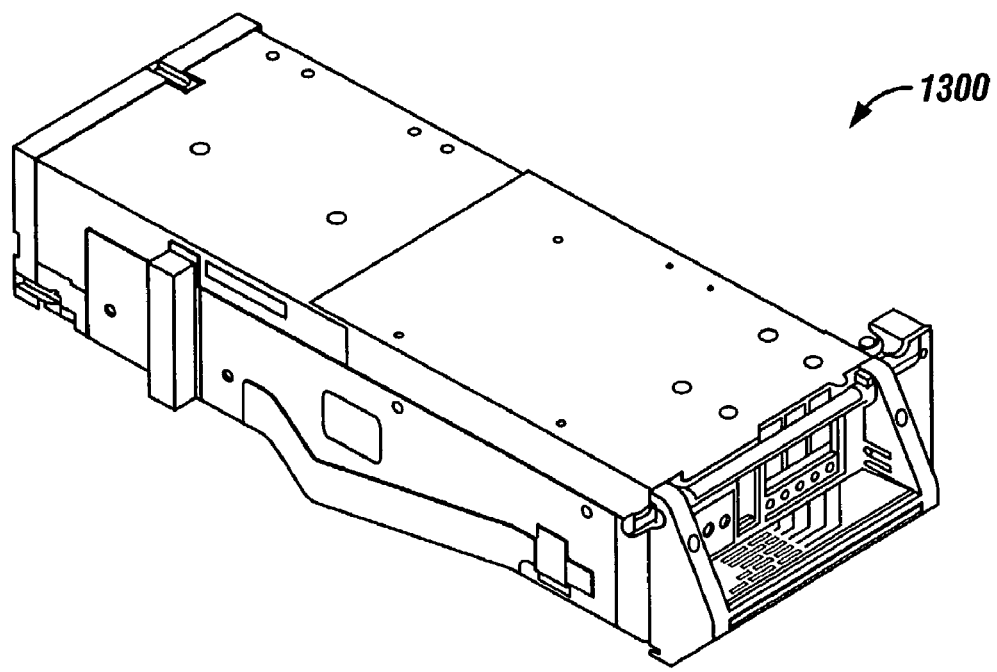
FIG. 14 is a rear isometric view of the drive canister of FIG. 13.

Removable storage media 103 are inserted via robotic pickers 110, 120 into drive enclosures 130, 140 via entrances 131, 141 (FIG. 1), respectively, where removable storage media 103 are mounted inside the data storage drive, such as tape drive 200 (FIG. 2) or data storage drive 1300 (FIGS. 13 and 14). Each picker 110, 120 includes a gripper assembly having a bar code scanner for reading cartridge labels, or other means for identifying the cartridges. As best shown in FIG. 9, a gripper assembly 901 may contain, for example, a plurality of grippers 903 (e.g., two grippers) for mixed media support (i.e., one gripper for each different media type in a single library), and/or a redundant gripper for libraries with a single type of media. The grippers 903 are mounted in a cage that can pivot from one side of the library to the other. This allows access to both storage walls 905, 907 by either gripper.

Figure 7:
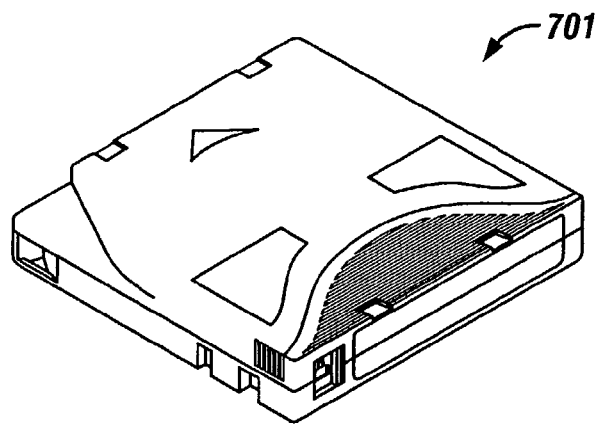
FIG. 7 is an isometric view of an alternate removable tape cartridge used in conjunction with the tape drive of FIG. 2.
Figure 8:
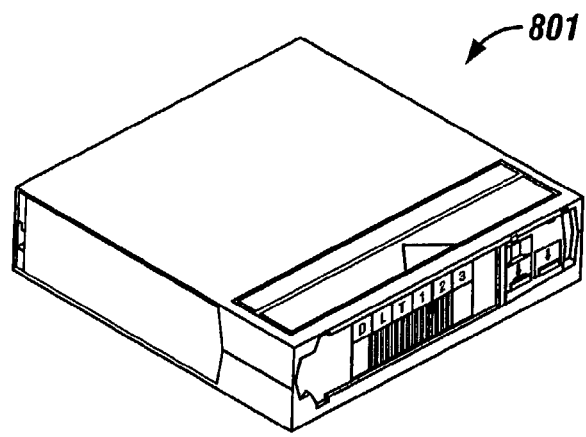
FIG. 8 is an isometric view of another alternate removable tape cartridge used in conjunction with the tape drive of FIG. 2.
Figures 1, 5A:
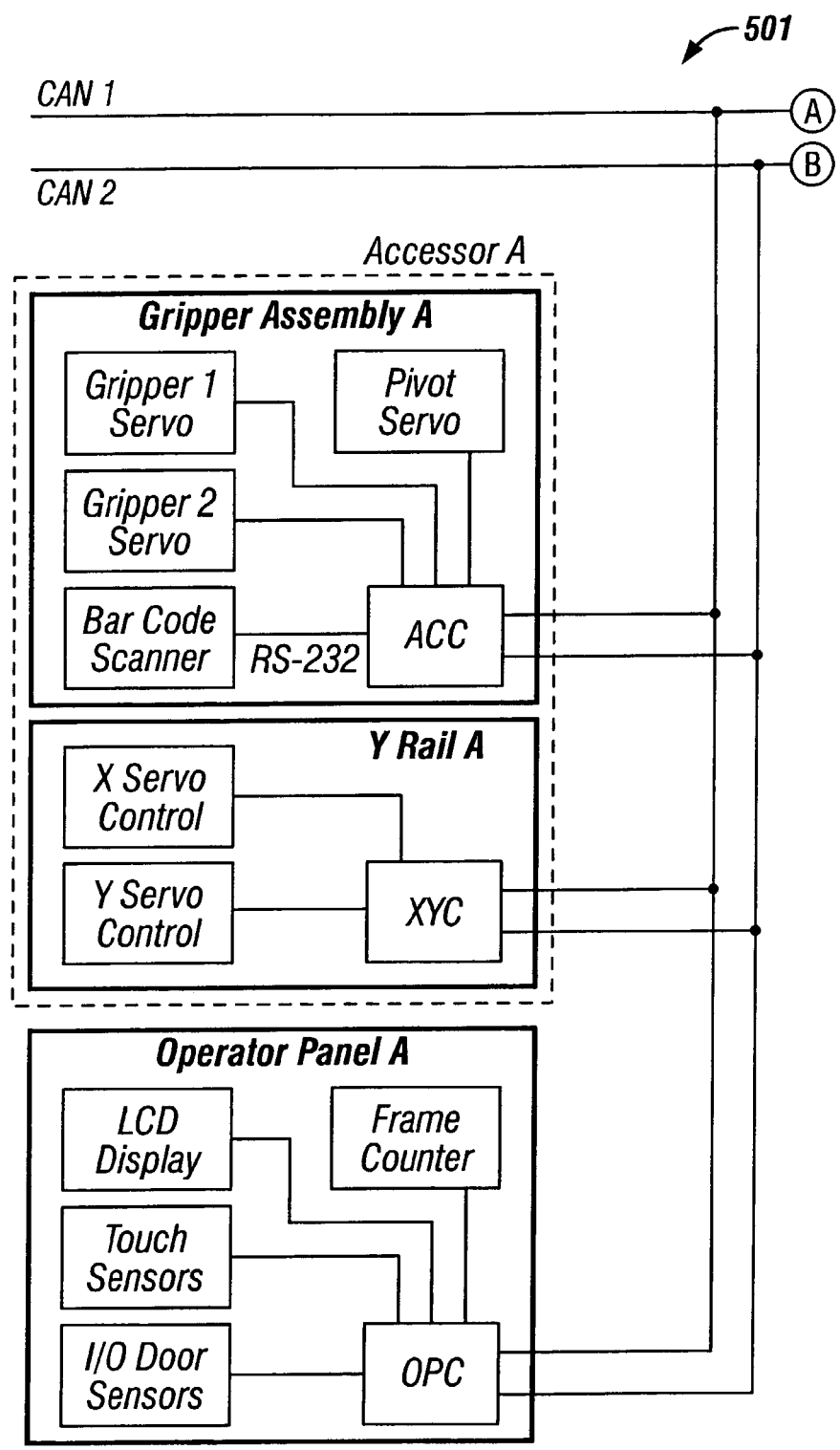
Figures 2, 5A:
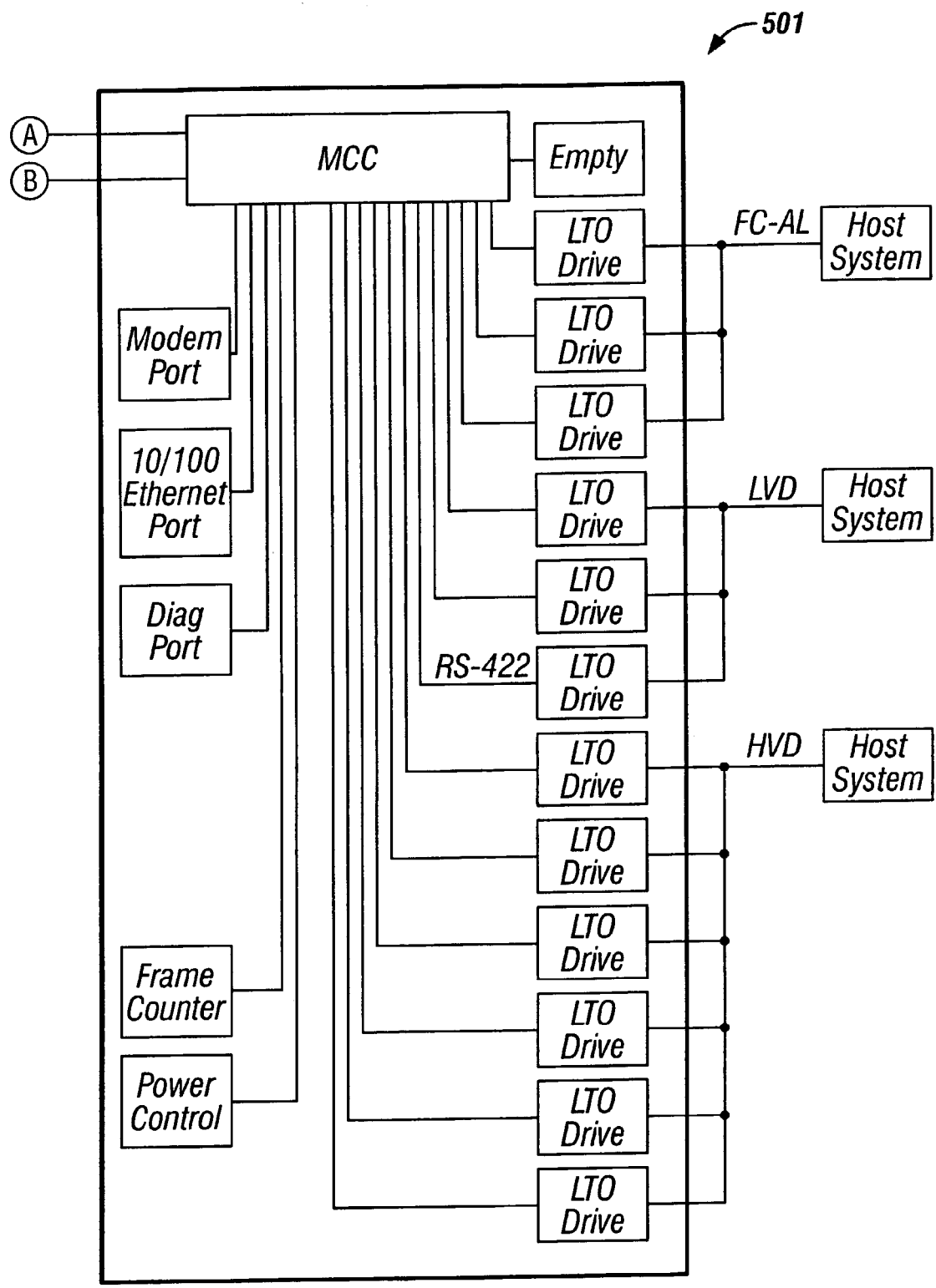
Figure 6:
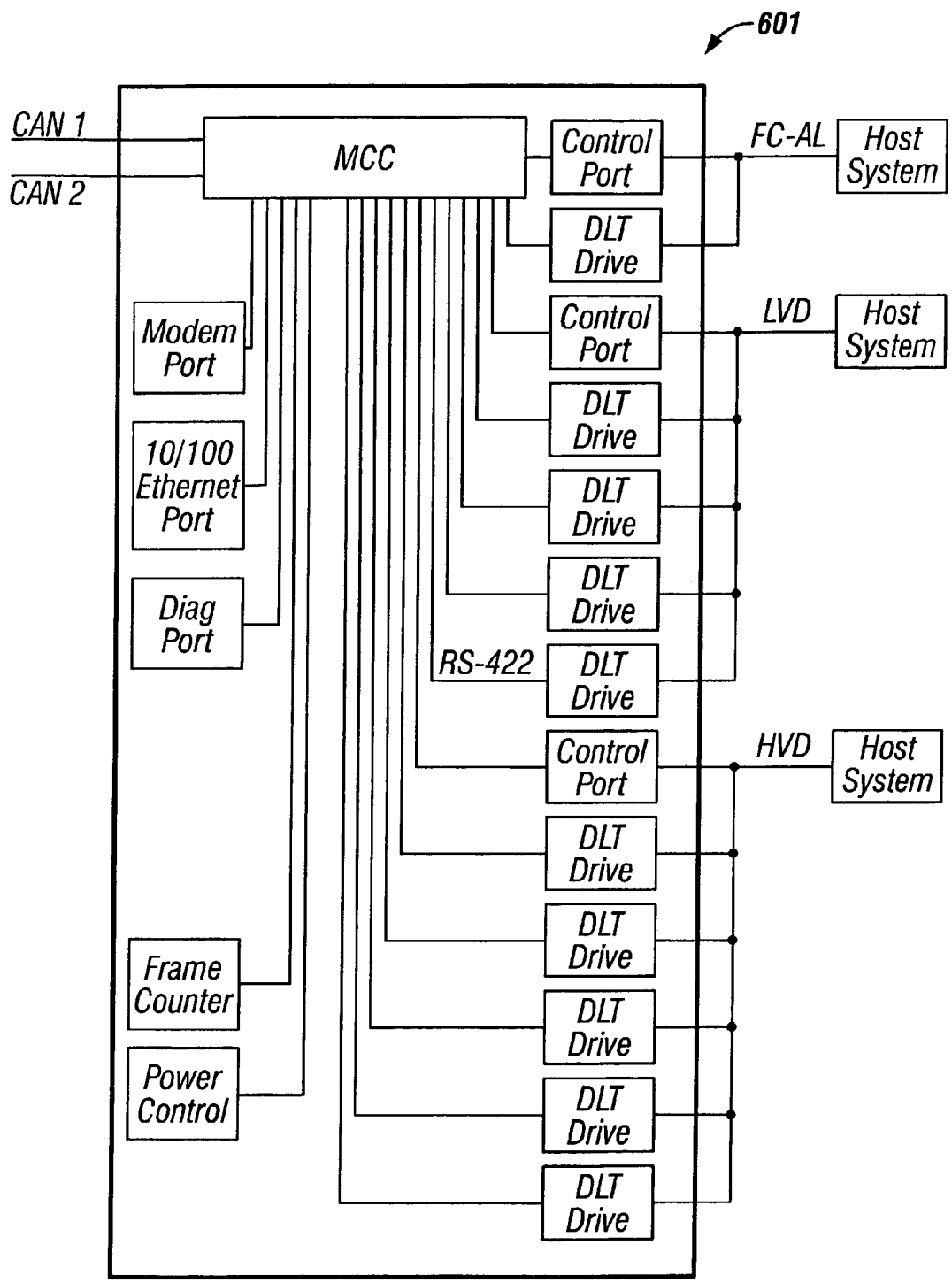
FIG. 6 is a schematic diagram of another alternate storage module utilized by the data storage and retrieval system of FIG. 1.

Referring now to FIG. 5, a schematic diagram of an optional frame or storage module known as a Linear Tape Open (LTO) D-frame 501 is shown. LTO D-frame 501 provides additional storage and may provide additional drives as well. The description is similar to that for storage module 101, except that there may be zero to twelve tape drives for LTO tape cartridges 701 (FIG. 7). If no drives are installed, then no MCC and supporting circuits/ports will be installed. FIG. 6 is a schematic diagram of an optional Digital Linear Tape (DLT) D-frame 601. DLT D-frame 601 provides additional mixed media storage and may provide additional tape drives as well for DLT tape cartridges 801 (FIG. 8). The description is similar to that of the LTO D-frame 501 with a few exceptions, such as a different type of drive and library/host control path.

Figure 10:
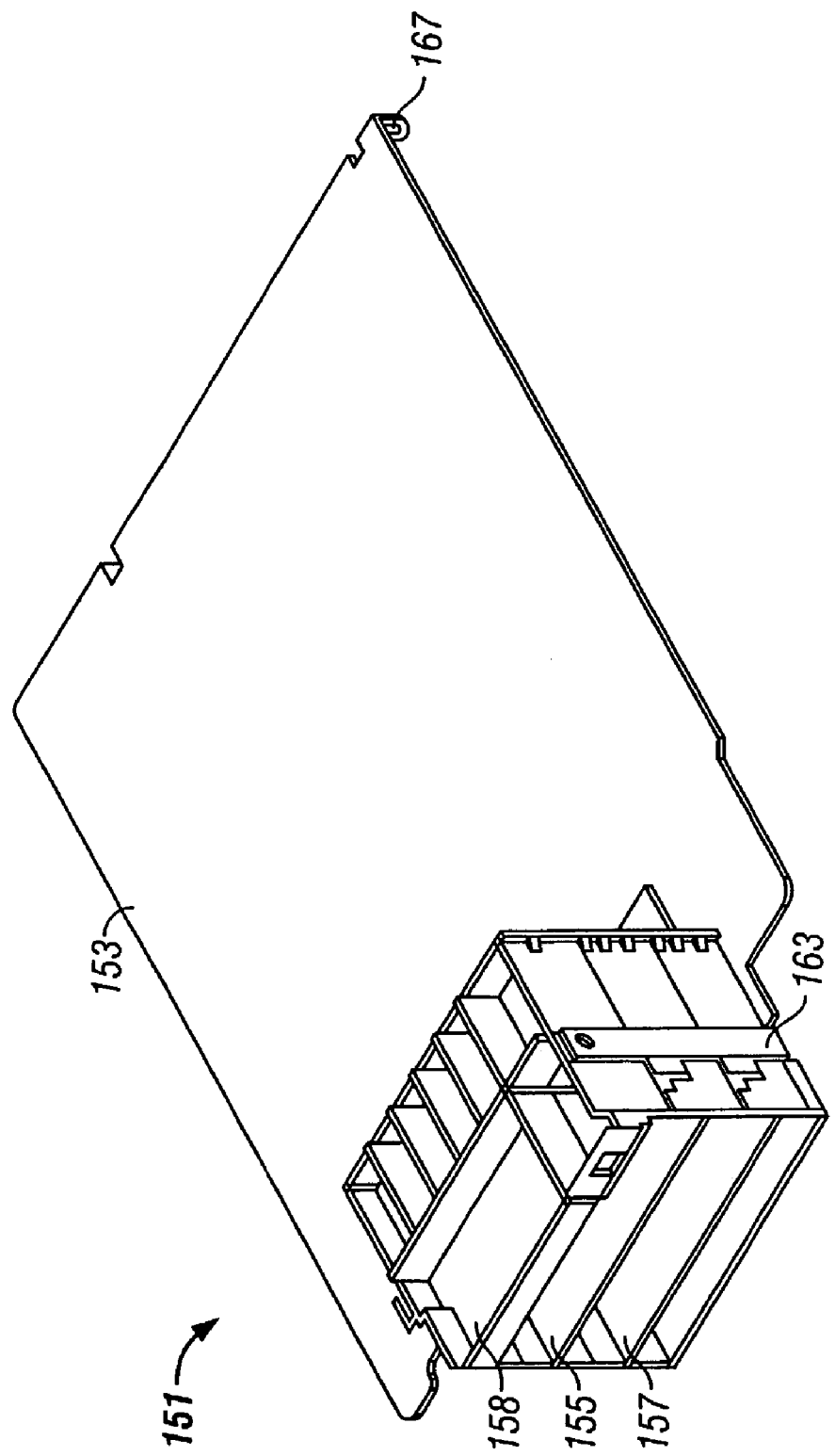
FIG. 10 is an isometric view of a portable test canister constructed in accordance with the present invention.
Figure 11:
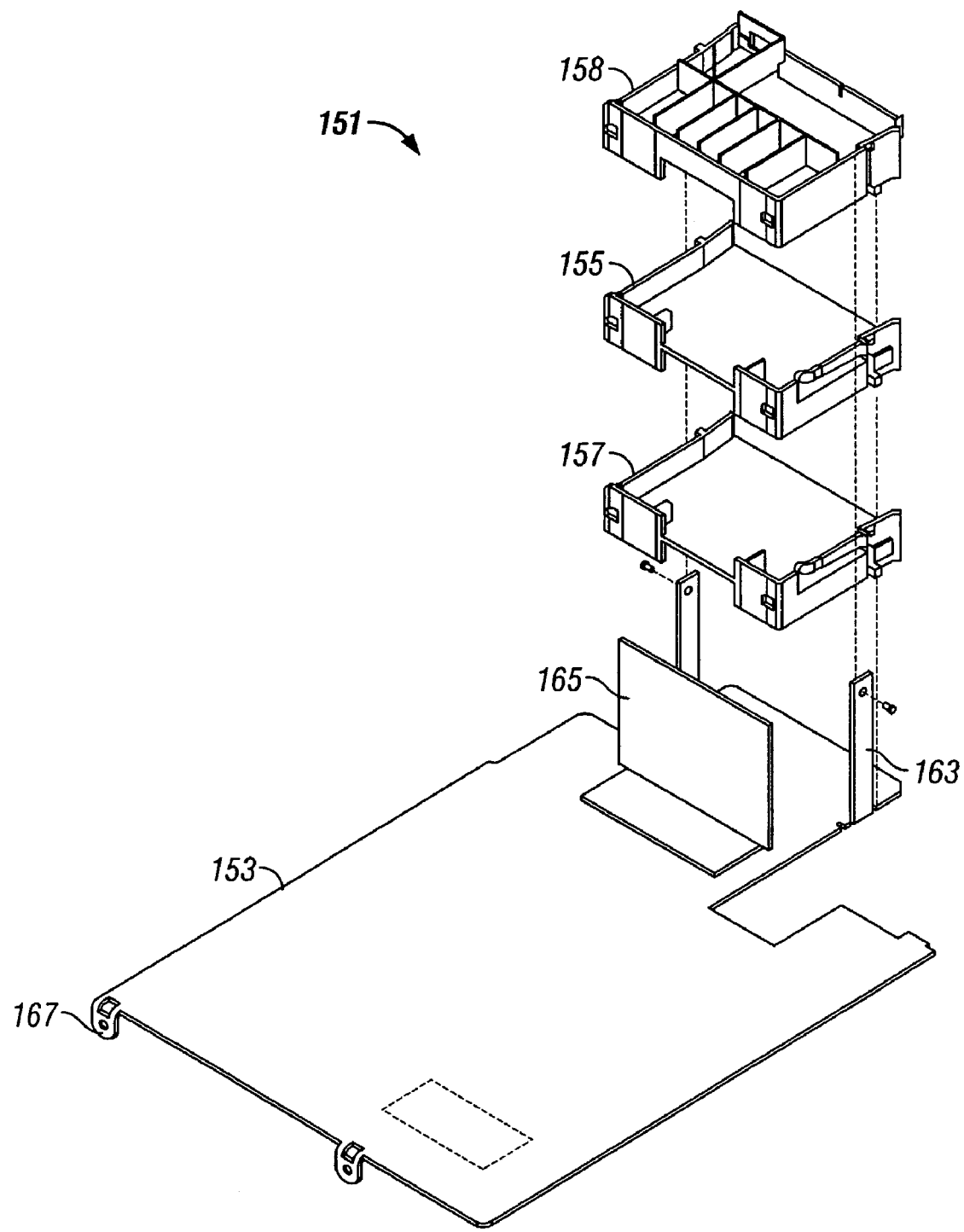
FIG. 11 is an exploded isometric view of the portable test canister of FIG. 10.

Referring now to FIGS. 10 and 11, one embodiment of a portable test canister 151 for servicing, expanding, or converting an automated data storage library such as system 100 (FIG. 1) is shown. Portable test canister 151 includes a planar base or test tray 153 having a generally rectangular shape with a mounting support surface on one end. Test tray 153 has a plurality of mounting features such as lateral brackets 163, end bracket 165, and bosses 167. Bosses 167 are located on one end of test tray 153, while brackets 163, 165 are located on the opposite end of test tray 153 adjacent to the mounting support surface.

Portable test canister 151 also includes one or more (two shown) test cartridge storage cells 155, 157. In the version shown, each test cartridge storage cell 155, 157 comprises a rectangular box-like structure having a base, two side walls, an end wall, a top wall, and an open front portion. The open front portions of test cartridge cells 155, 157 are designed to receive one cartridge into the cell for each type of cartridge (e.g., see FIGS. 3, 7, and 8) that is used by the automated data storage library for storage, test, and/or calibration of the robotic gripper. In addition, a top cap 158 is mounted to an upper end of the uppermost cell 155. Top cap 158 includes a plurality of compartments and a fiducial sensor that is used to precisely align and ensure accurate operation of the robotic picker with respect to the portable test canister 151.

Portable test canister 151 is assembled by stacking cells 155, 157, and top cap 158 as shown in FIG. 11, which nest together to prevent movement therebetween. That subassembly is then located between brackets 163, 165 and secured thereto with fasteners to complete the final assembly of portable test canister 151 (FIG. 10).

Figure 15:
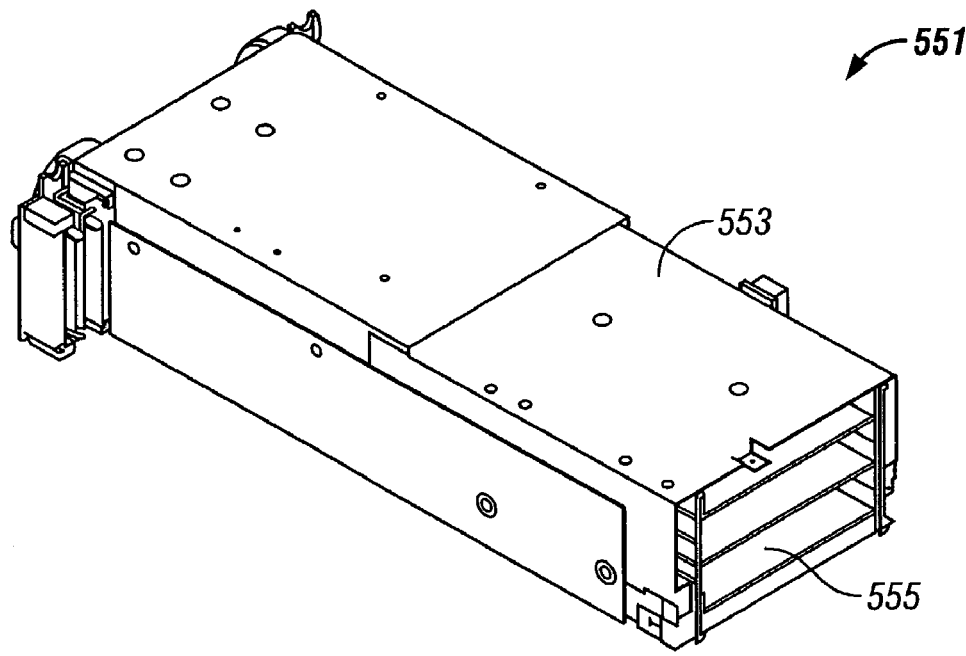
FIG. 15 is a front isometric view of an alternate embodiment of a portable canister.
Figure 16:
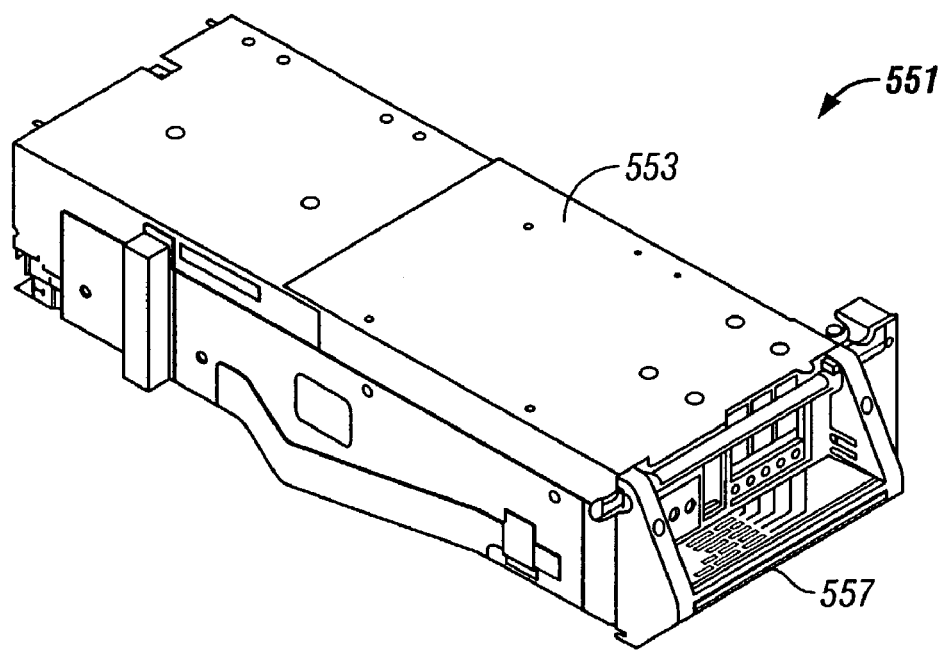
FIG. 16 is a rear isometric view of the portable canister of FIG. 15.

Referring now to FIGS. 15 and 16, another embodiment of a portable canister 551 for servicing, expanding, or converting an automated data storage library such as system 100 (FIG. 1) is shown. Portable canister 551 includes a generally rectangular base 553 having one or more (three shown) cartridge storage cells 555. In the version shown, each cartridge storage shelf or cell 555 comprises a rectangular box-like structure having a base, two side walls, an end wall, a top wall, and an open front portion. The open front portions of cartridge storage cells 555 may be used to receive one cartridge for each type of cartridge (e.g., see FIGS. 3, 7, and 8) that is used by the automated data storage library. In addition, a handle 557 is mounted to base 553 opposite the cells 555 for "hot-pluggably" loading and unloading canister 551 with respect to system 100 without interrupting its operation.

Figure 12:
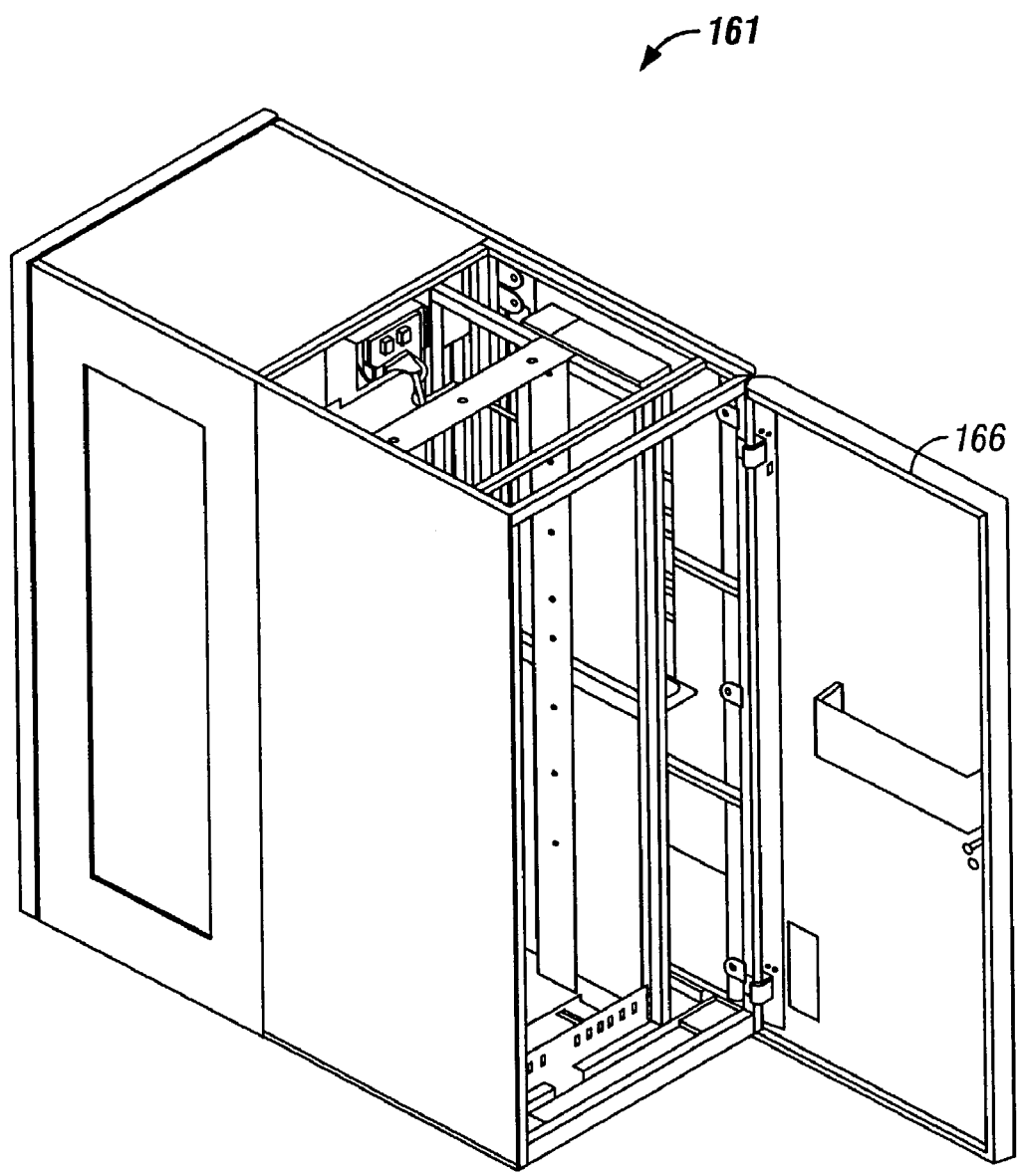
FIG. 12 is a reverse isometric view of the storage module of FIG. 9 with the front door closed and the rear door open.

As shown in FIG. 9, the canisters 151 and/or 551 are adapted to be mounted within a standard drive slot or compartment 159 in a frame 161 of the multi-frame library of system 100. The canisters are merely entered through a rear door 166 (FIG. 12) of frame 161 and slides into the slot-like compartment 159 on its tray 153 or base 553. Portable canisters 151, 551 are securely mounted in compartment 159 with fasteners or latches.

When using the portable canister as a test canister, the portable canister may be located in any drive slot or storage slot of any frame in a single accessor library. For a dual accessor library, it may be advantageous to locate a canister at each end of the library to minimize any potential disruption that may be caused when testing or calibrating the grippers of one of the accessors. Still further, it may be advantageous to locate the drives in frames other than the frames that contain the portable canisters.

The portable canisters allow a library to test and/or calibrate its gripper(s) in any of a number of locations. Portability allows the canisters to be moved as conditions in the library change. Examples include changes in configuration, a change in the desired test location, the addition or removal of drives or frames, etc. Portability also allows multiple canisters to be installed. Still further, portability allows spatial reuse of the space within the library. This means that a location that may contain a portable canister may also contain drives, storage, import/export stations, etc.

The canisters may comprise one or more cartridge cells, one or more calibration targets or features, and one or more identifiers to allow the library to recognize the type of canister. The cartridge cells of the portable canisters may be used to hold diagnostic cartridges, cleaning cartridges, normal data cartridges, or combinations thereof. The cartridge cells of the portable test canister may be used to test the ability of the library gripper to retrieve media from the cartridge cell and place media into the cartridge cell. There may be one or more cartridge cells for each type of media supported by the library, or there may be separate canisters for each media type in the library, or combinations thereof.

In one embodiment of the present invention, the portable storage canister is placed in a storage slot in the library. This storage slot is used as an expansion slot to simplify the user upgrade process. The storage slot may exist in a normal area of storage, in a drive area, in an import/export area or in an area dedicated to expansion. The storage canister provides one or more storage cells for holding data storage media. The storage canister can be added to or removed from the library without disrupting normal library operation. In this specification, the term "normal library operation" refers to the library processing of host commands, which may comprise moving media from drive to storage cell, or vice versa. Ideally, the user or customer can upgrade the library with the additional storage.

In another embodiment, the portable storage canister is placed in a multi-purpose slot of the library. The multi-purpose slot may contain the portable storage canister, drives, some other component of the library, or nothing at all. Drive slots are common and usually exist in every frame of a library. Drive slots provide a high degree of portability and spatial reuse. In this embodiment, maximum library space can be utilized because storage is easily removed to add new drives. The portable storage canister can be moved as drives and frames are added to, or removed from, the library. The portable storage canister may be added to or removed from the library without disrupting normal library operation. Ideally, the user can remove the portable storage canister and add a drive.

In yet another embodiment, the portable canister is used as a test canister and is placed in a drive slot of the library. Drive slots are common and usually exist in every frame of a library. Dedicated service areas consume valuable library space that cannot be reclaimed. Drive slots, on the other hand, provide a maximum level of portability and spatial reuse. In this embodiment, the portable test canister only consumes library space when a library is full of drives or storage. The portable test canister can be moved as drives and frames are added to, or removed from, the library. Dual accessor libraries are expected to maintain normal operation, even when being serviced. The impact to normal library operation can be minimized, in a dual accessor library, by placing the portable canisters at both ends of the library. This allows one accessor to calibrate or test its grippers while another accessor is performing normal library operations. There may still be a small potential for impact to normal library operation during a test/calibrate operation, depending on the design of the library. For example, if drives slots are arranged in columns and a portable test canister is located in a column that also contains drives then an accessor cannot access one of those drives while the other accessor is testing or calibrating its gripper. The testing accessor may be temporarily moved out of the way to allow access to a drive. Alternatively, one accessor may wait until the other accessor has finished any operations in the conflicting column. Still further, the impact can be eliminated by locating all of the drives in frames other than the end frames.

In still another version of the present invention where the portable canister is used as a test canister, one portable canister is typically located in the frame on at least one end of the library. During the life of the library, the size of the library may be changed by adding or removing one or more frames to the library. However, the process and method for relocating portable canister is much simpler than prior art methods, wherein the service bays are non-portable and dedicated to their positions with other equipment in the library. Unlike prior art methods, there is no need to shut down the entire library, disassemble the various frames, uninstall the service bay, and then reconfigure and reassemble the frames before relocating the service bay. Rather, the portable canister of the present invention is adapted to be quickly relocated by simply removing it from its original position and relocating the portable test canister to one of the drive compartments in a new frame (e.g., the new end frame) of the library.

This operation may be performed by service personnel removing the portable canister from the back side of the frame 161 (FIG. 12) by opening the rear door 166 in the same manner that the hot-pluggable drives are removed/installed, without interrupting operation of the library. In this manner, the new end frame(s) may be installed at the end of the library without reconfiguring the entire library system due to the original location of the service bay. Moreover, the portable canisters are externally removable and enables interchangeability between a service bay and a storage frame.

The library may detect the presence and/or type of the portable canister through operator input at a user interface of the library, by using an identifier associated with the portable canister, by touch or feel of the library accessor, or through some other means. Examples of portable canister identifiers may comprise bar code labels or other optical identifiers, smart card technology or other wireless identifiers, etc. Examples of touch or feel may comprise mechanical features that can be detected or sensed through various motions of the accessor.

While the invention has been shown or described in only some of its forms, it should be apparent to those skilled in the art that it is not so limited, but is susceptible to various changes without departing from the scope of the invention. For example, while a tray was described for the portable test canister, other mechanical packaging may be used. As another example, a drive slot was described as the location for holding a portable test canister but other locations may be used. For example, the portable test canister may be placed in a storage location or an import/export station, etc. Conversely, the automated data storage library may be configured such that the portable storage canister cannot occupy an area within the import/export station.

What is claimed is:

1. A method of converting an automated data storage library, comprising:

providing an automated data storage library having a plurality of drive slots, at least one of said plurality of drive slots containing a data storage drive for reading data from and/or writing data to data storage media, a plurality of data storage cells for storing the data storage media, at least one accessor for transporting the data storage media between the plurality of data storage cells and the data storage drives, one or more grippers associated with said at least one accessor for gripping the data storage media, one or more portable storage canisters having at least one storage cell for holding the data storage media, and at least one of said plurality of drive slots containing one of said one or more portable storage canisters;

removing said one of said one or more portable storage canisters from said drive slot; and placing a data storage drive into said drive slot.

2. The method of claim 1 wherein said removing step and said placing step are performed from the same location of the antomated data storage library.

3. The method of claim 1 wherein said removing step and said placing step are done without interrupting normal operations of said automated data storage library.

4. A method of upgrading an automated data storage library, comprising:

providing an automated data storage library having one or more data storage drives for reading data from and/or writing data to data storage media, a plurality of data storage cells for storing the data storage media, at least one accessor for transporting the data storage media between the plurality of data storage cells and said one or more data storage drives, one or more grippers associated with said at least one accessor for gripping the data storage media, one or more portable storage canisters having at least one storage cell for holding the data storage media, and one or more storage slots for holding said portable storage canisters, wherein:

a portable storage canister is placed in a storage slot to increase the storage capacity of the automated data storage library, and;

said storage canister is placed in said storage slot without disruption of normal operations of said automated data storage library;

said placing of said portable storage canister is performed from a rear portion of the automated data storage library; and at least one import/export station and said portable storage canister cannot occupy an area within the import/export station.

* * * * *